US007974063B2

(12) United States Patent
Vo et al.

(10) Patent No.: US 7,974,063 B2
(45) Date of Patent: Jul. 5, 2011

(54) HYBRID SURGE PROTECTOR FOR A NETWORK INTERFACE DEVICE

(75) Inventors: Chanh Cuong Vo, Keller, TX (US); Boyd Grant Brower, Keller, TX (US); Carl Randall Harrison, Decatur, TX (US); John Joseph Napiorkowski, Irving, TX (US); Rodger Alan Tenholder, Saginaw, TX (US); Sean Matthew Arnold, Justin, TX (US)

(73) Assignee: Corning Cable Systems, LLC, Hickory, NC (US)

( * ) Notice: Subject to any disclaimer, the term of this patent is extended or adjusted under 35 U.S.C. 154(b) by 450 days.

(21) Appl. No.: 11/985,723

(22) Filed: Nov. 16, 2007

(65) Prior Publication Data

US 2009/0128978 A1 May 21, 2009

(51) Int. Cl.
*H02H 1/00* (2006.01)

(52) U.S. Cl. ......................... 361/129; 361/119; 361/124

(58) Field of Classification Search .......... 361/117–120, 361/124, 125, 127–130; 337/31, 32
See application file for complete search history.

(56) References Cited

U.S. PATENT DOCUMENTS 4,984,125 A 1/1991 Uwano ......................... 361/124
5,248,953 A 9/1993 Hönl ............................... 337/32
5,383,085 A 1/1995 Boy et al. ...................... 361/119
5,388,023 A 2/1995 Boy et al. ...................... 361/129
5,398,152 A 3/1995 Borkowicz et al. ........... 361/119
5,423,694 A 6/1995 Jensen et al. .................. 439/417
5,475,356 A 12/1995 Kasahara ........................ 337/31
5,557,065 A * 9/1996 Brower et al. ................ 174/564
5,557,250 A 9/1996 Debbaut et al. ................. 338/21
5,569,972 A 10/1996 Lange ...................... 313/231.11
5,588,869 A 12/1996 Jensen et al. .................. 439/417
5,644,465 A 7/1997 Lange et al. .................. 361/120
5,742,223 A 4/1998 Simendinger, III et al. ..... 338/21
5,745,023 A 4/1998 Totsuka ........................ 337/160
5,768,082 A 6/1998 Lange et al. .................. 361/120
6,327,129 B1 12/2001 Oertel et al. .................. 361/118
6,424,514 B1 7/2002 Boy et al. ...................... 361/119
6,445,560 B1 9/2002 Bobert et al. ................. 361/120
6,606,232 B1 8/2003 Vo et al. ........................ 361/119
6,687,109 B2 2/2004 Bennett et al. ................ 361/119
6,710,996 B2 3/2004 Bobert et al. ................. 361/124
6,724,605 B1 4/2004 Boy et al. ...................... 361/120
6,795,290 B2 9/2004 Bobert et al. ................. 361/129
7,035,073 B2 4/2006 Bennett et al. ................ 361/119

(Continued)

*Primary Examiner* — Rexford N Barnie
*Assistant Examiner* — Christopher J Clark
(74) *Attorney, Agent, or Firm* — John H. Vynalck

(57) ABSTRACT

A hybrid surge protector for a network interface device (NID) is disclosed. The hybrid surge protector includes a fail-safe spring connected to the ground electrode of a three-electrode gas tube. Tabs on the fail-safe spring are held away from the gas-tube end electrodes by a fusible element. The hybrid surge protector also includes metal-oxide varistor elements ("MOVs") in contact with the gas-tube end electrodes and with the ground electrode via an MOV spring. This arrangement provides for two initial paths to ground-one path from the gas-tube end electrodes to the ground electrode through the gas tube, and another from the gas-tube end electrodes to the ground electrode through the MOVs and the MOV spring. The dominant path to ground starts as the MOV ground path but switches to the gas-tube path as the gas tube becomes activated. Another path to ground via the fail-safe spring is also available should the gas tube overheat. A surge protection module that includes the hybrid surge protector is also disclosed.

21 Claims, 11 Drawing Sheets

U.S. PATENT DOCUMENTS

| | | | | |
|---|---|---|---|---|
| 7,053,536 | B1 | 5/2006 | Boman et al. | 313/231.11 |
| 7,466,530 | B2 * | 12/2008 | Bobert et al. | 361/124 |
| 2007/0147602 | A1 | 6/2007 | Vo | 379/413.02 |
| 2007/0160193 | A1 | 7/2007 | Vo et al. | 379/413.02 |
| 2007/0160194 | A1 | 7/2007 | Vo et al. | 379/413.02 |
| 2007/0160195 | A1 | 7/2007 | Vo et al. | 379/413.04 |

* cited by examiner

HYBRID SURGE PROTECTOR FOR A NETWORK INTERFACE DEVICE

BACKGROUND OF THE INVENTION

1. Field of the Invention

The present invention relates to surge protectors, and in particular to surge protectors for network interface devices.

2. Technical Background

Telephone service is provided by a telephone company ("provider") to a number of different customers of the provider, commonly referred to as "subscribers." Each subscriber may purchase as many separate telephone lines as desired and equip his or her home or business with various types of telephone equipment. Subscribers are responsible for proper operation of the telephone equipment at their end, and the provider is responsible for proper operation of the telephone network up to the interface between the provider wiring and the subscriber wiring.

A telephone network interface device ("NID") serves as the demarcation point between the provider wiring and the subscriber wiring. A NID serves the function of isolating the provider portion of the system (i.e., the provider wiring) from that of the respective subscribers. Such isolation is desirable for a number of important reasons, including segregating the responsibility for faults or malfunctions that may occur in the respective parts of the system.

In practice, NIDs are typically mounted to an exterior wall of a house or building. Conventional NIDs generally include a container or housing, the interior of which is divided into a provider portion and a subscriber portion. Provider wiring typically enters the NID and terminates in the provider portion. The subscriber wiring typically enters the NID and terminates in the subscriber portion. At least one interconnect apparatus is located between the two portions and generally operates to connect the subscriber wiring to the provider wiring.

The provider portion also typically contains protective devices such as surge protectors to protect equipment and users from excess voltages. Surge protectors operate by diverting voltage surges, also known as overvoltages, on a telecommunications line to ground. Such surge protectors utilize various types of protection elements to divert unacceptable levels of voltage to ground. A surge protector that utilizes a single protection element may not offer sufficient protection against a prolonged voltage surge. A surge protector utilizing more than one type of protection element can provide redundancy or improve the performance of the surge protector. What is needed is a low-cost surge protector for a NID that provides such redundancy, that has a fast response, and that is usable in a variety of presently deployed NIDs.

SUMMARY OF THE INVENTION

A first aspect of the invention is a hybrid surge protector assembly for a network interface device (NID), for protecting against a voltage surge. The surge protector includes a gas-tube protective element that includes two end electrodes and a central ground electrode that define a first path to ground during the voltage surge. The assembly also includes a conducting fail-safe spring connected to the ground electrode. The fail-safe spring has an end section supported above the gas-tube protective element by a fusible element that, when melted, allows the fail-safe spring end to electrically contact the gas-tube end electrodes. The fail-safe spring defines a second path to ground from the gas-tube end electrodes when the fusible element melts during the voltage surge. The assembly also includes at least one metal-oxide varistor element ("MOV") arranged on a gas-tube end electrode and electrically connected to the ground electrode by a MOV spring. The MOV and MOV spring are configured to define a third path to ground from the gas-tube end electrodes when the MOV is activated by the voltage surge. The third path to ground prevents the gas-tube protective element from initially overheating by providing an initially predominant path to ground. The first path to ground prevents the gas-tube protective element from failing due to at least a portion of the voltage discharge following the second path to ground.

A second aspect of the invention is a hybrid surge protection module for a network interface device (NID) for connecting provider wires to subscriber wires. The module includes the above-described hybrid surge protector, and an enclosure that defines an enclosure interior that accommodates the hybrid surge protector. The enclosure is configured to receive and electrically connect the provider and subscriber wires to the hybrid surge protector, and can also house a sealant material to protect the hybrid surge protector.

A third aspect of the invention is a method of providing overvoltage surge protection for a network interface device. The method includes defining a first path to ground during the overvoltage by providing a gas-tube protective element that includes two end electrodes and a central ground electrode connected to ground. The method also includes defining a second path to ground from the gas-tube end electrodes by providing a conducting fail-safe spring connected to the ground electrode and having an end supported above the gas-tube protective element by a fusible element that, when melted during the overvoltage, allows the fail-safe spring end to electrically contact the gas tube end electrodes to establish said second path to ground. The method also includes providing a third path to ground by providing at least one metal-oxide varistor element (MOV) on the gas-tube end electrodes and electrically connected to the ground electrode by a MOV spring, the MOV and MOV spring configured to define said third path to ground from the gas-tube end electrodes when the MOV is activated by the voltage surge. The method also includes initially directing the overvoltage to ground via the first and third paths to ground, wherein the third path to ground is initially predominant, and then the first path to ground becomes predominant via deactivation of the MOV during the overvoltage as the gas-tube protective element becomes increasingly more activated (conductive).

A fourth aspect of the invention is a hybrid surge protector assembly for a network interface device (NID) that connects provider wires to subscriber wires and protects against a voltage surge. The surge protector includes a three electrode gas-tube protective element having a central ground electrode and two end electrodes, and having a direct-current (DC) breakdown voltage. A fail-safe spring is electrically connected to the ground electrode and is held spaced apart from the end electrodes by respective gaps using a fusible element in thermal contact with the gas-tube protective element. At least one metal-oxide varistor element (MOV) is placed in contact with an end electrode and is electrically connected to ground via an MOV spring. The MOV has a clamping voltage less than the DC breakdown voltage of the gas tube so that in response to the voltage surge, the MOV activates faster than the gas-protective tube to form an initial predominant path to ground.

Additional features and advantages of the invention are set out in the detailed description which follows, and in part will be readily apparent to those skilled in the art from that description or recognized by practicing the invention as described herein, including the detailed description which follows, as well as the appended drawings.

It is to be understood that both the foregoing general description and the following detailed description present exemplary embodiments of the invention, and are intended to provide an overview or framework for understanding the nature and character of the invention as it is claimed, and not for reasons of limitation. The accompanying drawings are included to provide a further understanding of the invention, and are incorporated into and constitute a part of this specification. The drawings illustrate various embodiments of the invention, and together with the detailed description, serve to explain the principles and operations thereof, and are not provided for reasons of limitation.

DETAILED DESCRIPTION OF THE INVENTION

Figure 1:
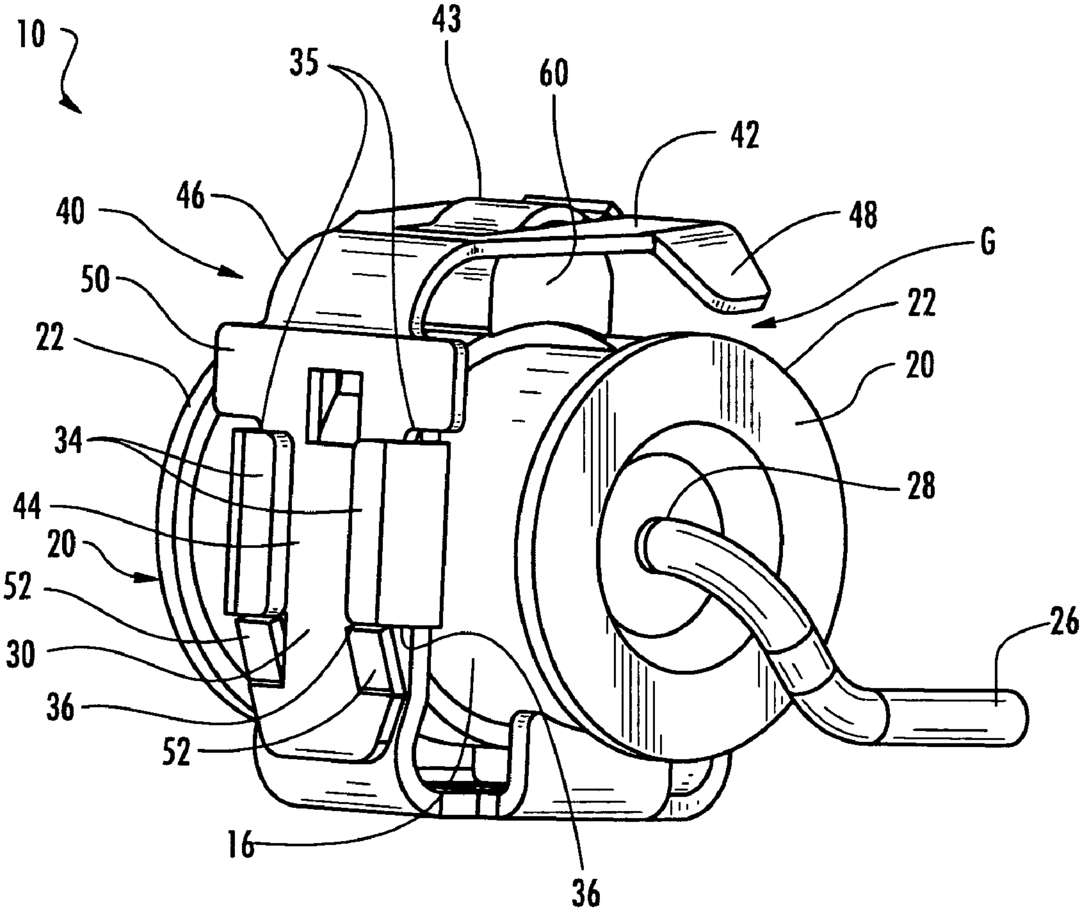
FIG. 1 is a side-rear perspective view of an example embodiment of the hybrid surge protector according to the present invention.

Reference is now made in detail to several exemplary embodiments of the invention, examples of which are illustrated in the accompanying drawings. Whenever possible, the same reference numerals are used throughout the drawings to refer to the same or like parts.

Embodiment with Fail-Safe Spring

Figure 2:
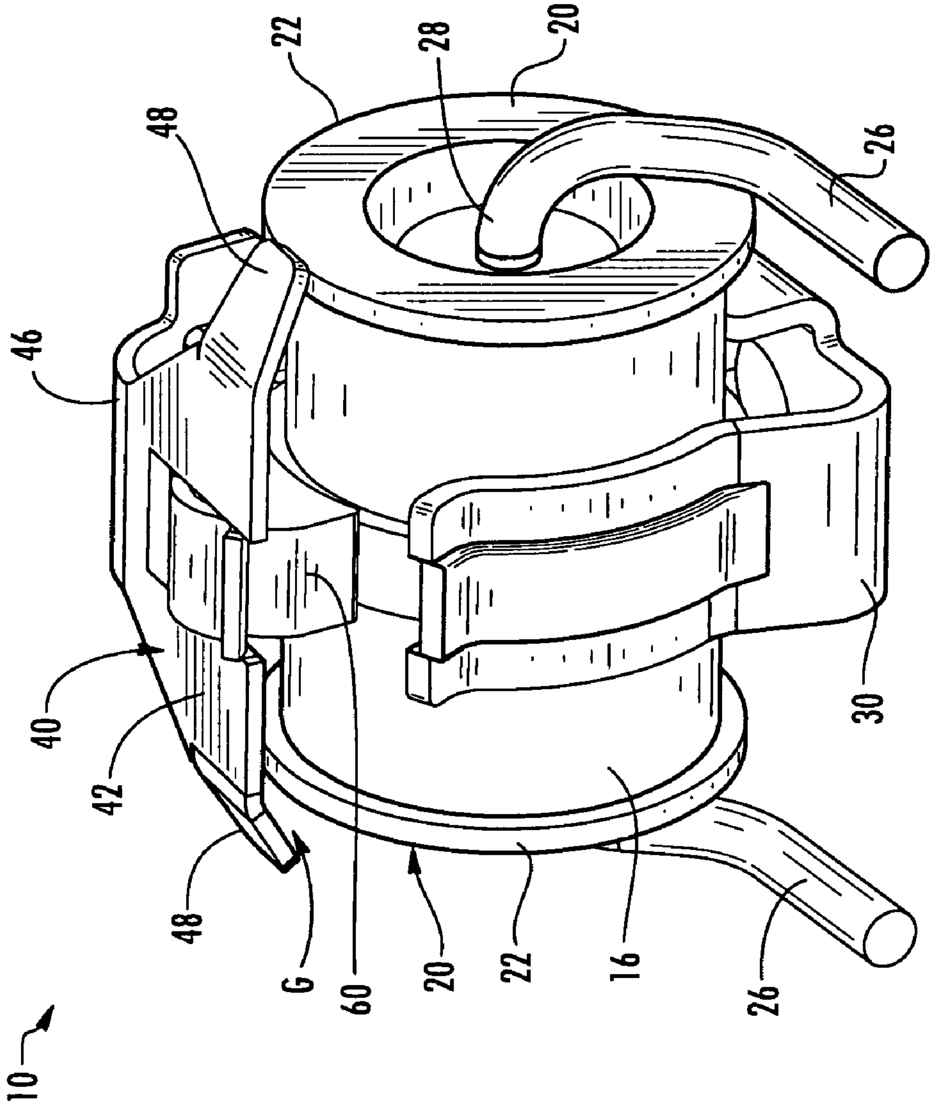
FIG. 2 is an elevated front perspective view of the hybrid surge protector of FIG. 1.

FIG. 1 is a side-rear perspective view of a first example embodiment of a hybrid surge protector assembly ("surge protector") 10 according to the present invention. FIG. 2 is a front elevated view of the surge protector of FIG. 1. Surge protector 10 includes a cylindrical gas-tube protector element ("gas tube") 16. Dish-shaped electrodes 20 are located at opposite ends of gas tube 16 and are also referred to herein as "gas-tube end electrodes" or just "end electrodes." End electrodes 20 have respective outer edges 22. Surge protector 10 includes lead wires 26 having ends 28 that terminate at a central location on respective electrodes 20 and that are electrically connected (e.g., spot-welded) thereto. Lead wires 26 connect to insulated displacement connectors ("IDCs") (not shown in FIG. 1), as discussed below. Lead wires 26 are also called "subscriber wires" since they connect to a subscriber.

Surge protector 10 also includes a ground electrode 30 centrally arranged on cylindrical gas tube 16 and electrically connected thereto. Ground electrode 30 includes flanges 34 on the outer edges of the electrode. Flanges 34 have respective top ends 35 and bottom ends 36.

Surge protector 10 further includes a conducting fail-safe spring 40. Fail-safe spring 40 includes opposite end sections 42 and 44 and a bend 46 of equal to or about 90 degrees and located about half-way between the two end sections. Spring end section 42 is generally flat and includes downwardly bent edge tabs 48. Spring end section 44 includes a generally flat portion 50 that has wedge-shaped protrusions 52. Flat portion 50 is configured so that it can be inserted into flanges 32 on ground electrode 30 at top end 35 and held therein by angled protrusions 52 that engage flange bottom end 36. Thus, in an example embodiment, the fail-safe spring 40 snaps onto ground electrode 30.

This particular arrangement of fail-safe spring 40 with ground electrode 30 would at this point leave tabs 48 touching respective electrode edges 22 because of the downward spring force created by spring bend 46. This would establish a ground path between gas-tube end electrodes 20 and ground electrode 30.

To prevent this ground path from being created, surge protector 10 further includes a fusible element 60 arranged between gas tube 16 and spring end section 42 of fail-safe spring 40. Fusible element 60 has a predetermined melt temperature and is in thermal communication with gas tube 16. In an example embodiment, fusible element 60 is or otherwise includes a solder pellet made of a fluxed metal alloy that has a predictable melt temperature and that transitions rapidly between the solid state and the liquid state. The melt temperature of fusible element 60 is selected based on the temperature at which gas tube 16 overheats (or is otherwise rendered inoperable), the thermal conductivity of the gas tube, and the location of the fusible element in the surge protector relative to the gas tube. An example alloy for fusible element 60 is 60% SN and 40% Pb, although other suitable alloys may also be used.

In an example embodiment, fusible element 60 preferably includes a solder fabricated by using a powder metallurgy process of pressing and sintering. In an example embodiment, fusible element 60 may also include an additional amount of solid, non-corrosive, non-conductive rosin flux. The additional amount is preferably less than 15%, more preferably less than 10%, and most preferably about 8%. The presence of the flux in fusible element 60 assists the solder to flow and helps ensure that the solder making up the fusible element will adhere to metal surfaces after it melts.

Fusible element 60 is sized to ensure that there is a gap G between fail-safe spring tabs 48 and electrode edges 22. In an example embodiment, spring end section 42 includes a curved portion 43 sized to accommodate a top portion of fusible element 60 and hold the fusible element in place between fail-safe spring 40 and gas tube 16.

When a voltage surge is carried to surge protector 10 (e.g., by lead wire 26), gas tube 16 acts as a gas discharge device that establishes a path to ground electrode 30, thereby protecting devices connected to surge protector 10 from being damaged by the overvoltage. However, should gas tube 10 overheat due to, for example, a prolonged voltage surge, it could be damaged to the point of failure and allow the overvoltage to reach the devices or the end users of the devices that the surge protector seeks to protect.

Figure 3:
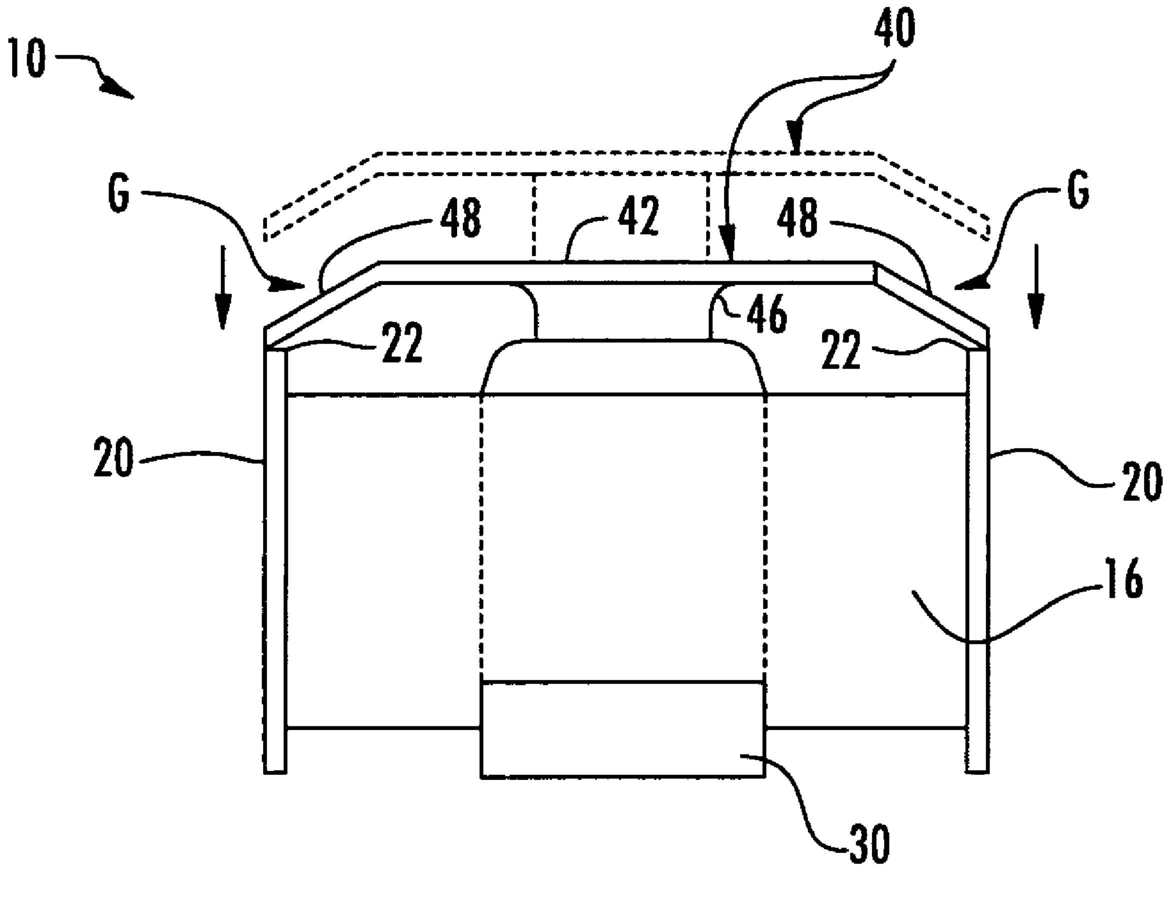
FIG. 3 is a close up view of the fail-safe spring of the hybrid surge protector of FIG. 1 engaging the gas-tube end electrodes when the fusible element separating the spring from the electrodes melts.

In the present embodiment, the heat generated by gas tube 16 as it experiences an overvoltage is absorbed by fusible element 60. When fusible element 60 absorbs a sufficient amount of heat from gas tube 16, it melts, and thus no longer supports spring end section 42. With reference now to FIG. 3, this allows tabs 48 of spring end section 42 to contact edges 22 of end electrodes 20. This establishes the aforementioned ground path from the end electrodes 20 to the ground electrode 30, which prevents a catastrophic failure of gas tube 16.

Embodiment with MOVs and Fail-Safe Spring

Figure 4:
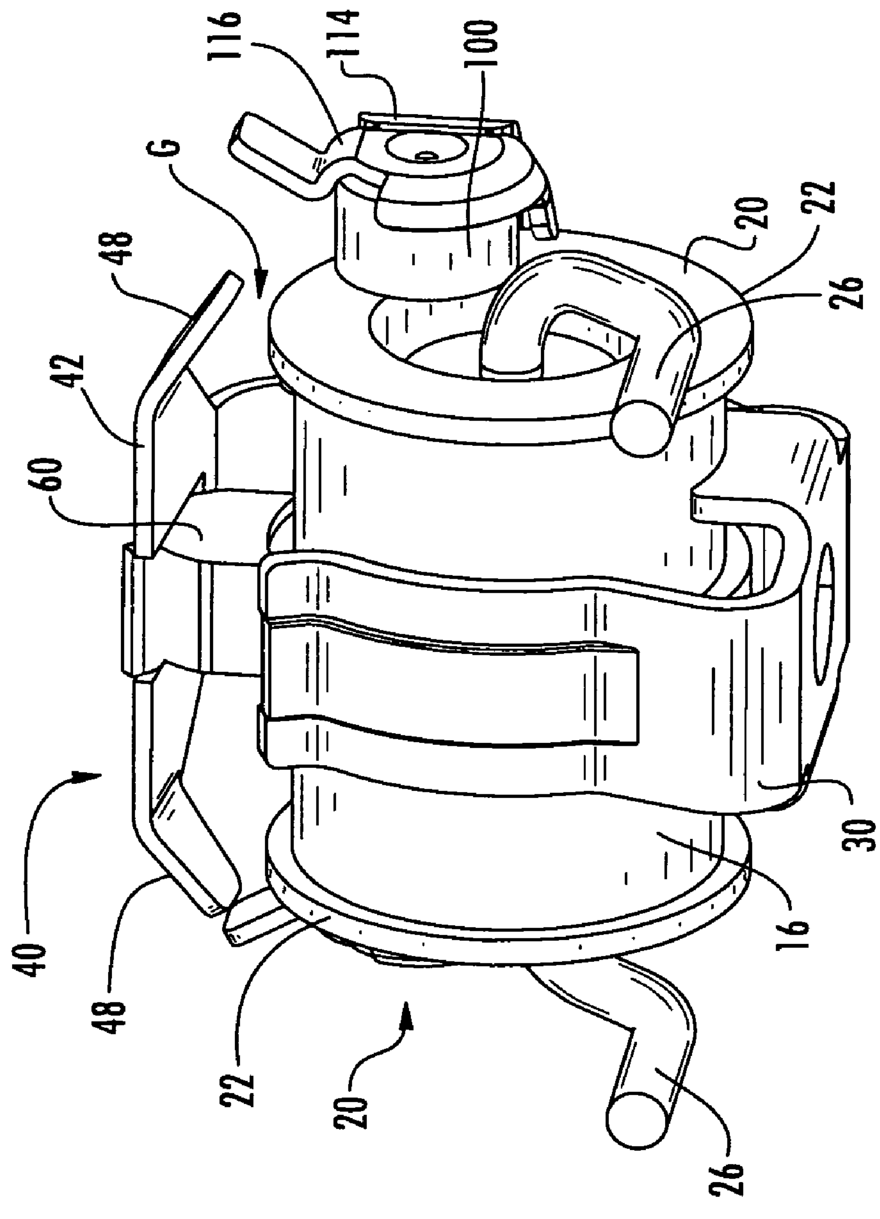
FIG. 4 is a front perspective view of an example embodiment of the hybrid surge protector of the present invention similar to that of FIG. 1, but further including MOVs and an MOV spring connected to the MOVs and to ground so as to provide additional voltage surge protection.
Figure 5:
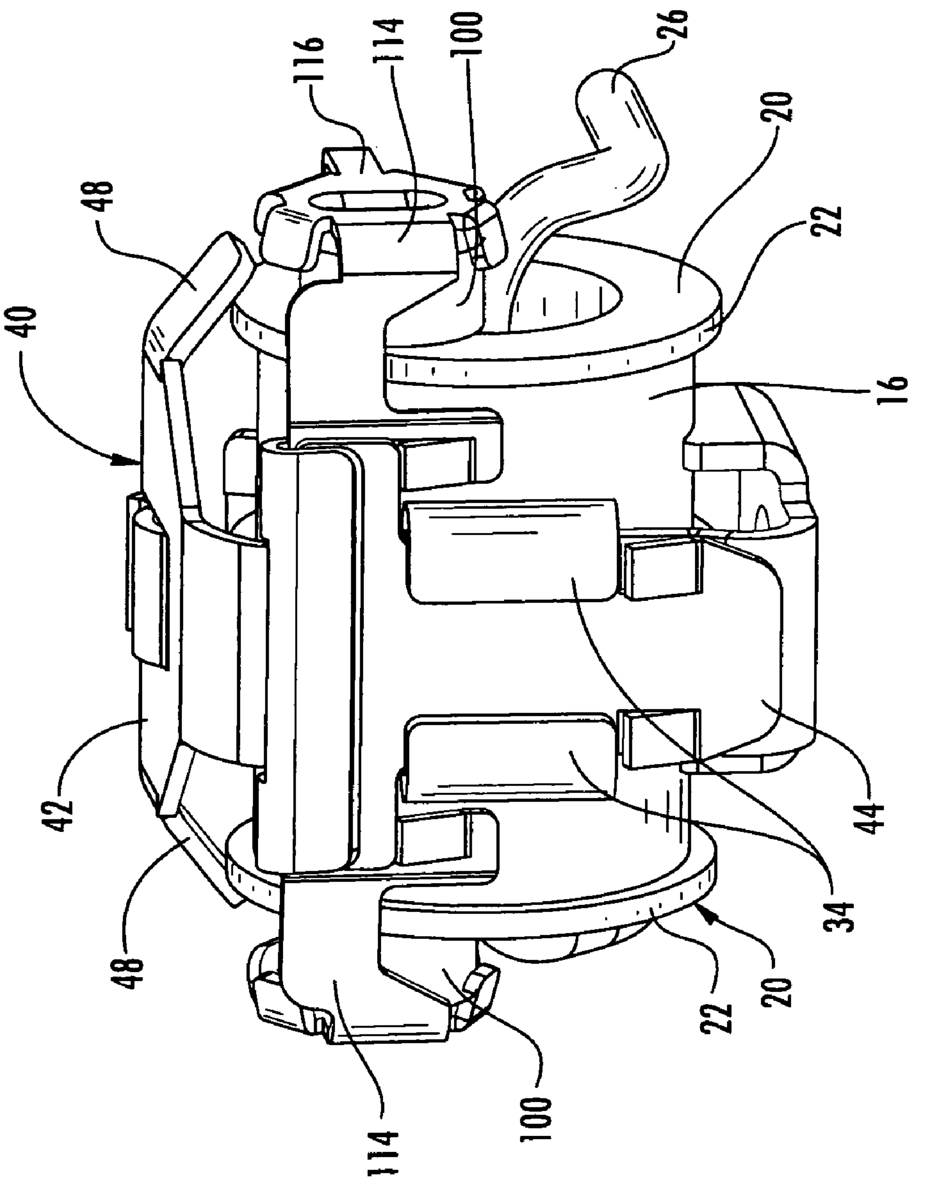
FIG. 5 is a rear perspective view of the hybrid surge protector of FIG. 4.

FIG. 4 is a front perspective view of a second example embodiment of hybrid surge protector 10 that employs both solid state and gaseous surge-protection elements. FIG. 5 is a rear perspective view of the hybrid surge protector of FIG. 4. An advantage of using solid-state elements is that they can react faster than gaseous elements in an overvoltage situation. The present embodiment combines solid state elements and gaseous elements in a manner that allows for the preferred ground path to advantageously change during the voltage surge to provide optimum voltage surge protection.

Surge protector 10 of the present example embodiment includes essentially the same elements as the first example embodiment discussed above, and further includes at least one metal-oxide varistor element ("MOV") 100 placed in contact with gas-tube electrodes 20. Surge protector 10 further includes an MOV spring 112 that clips to or that is otherwise affixed to ground electrode 30 so as to be in electrical contact therewith. MOV spring 112 includes arms 114 that extend outwardly and that bend around gas tube 16 so as to contact the MOV 100 without contacting electrodes 20. The spring force in MOV spring 112 serves to maintain electrical contact with the respective MOV 100 via arm 114. MOV spring arms 114 preferably have caps 116 configured to engage and hold MOVs 100.

MOVs 100 are used in conjunction with gas tube 16 to provide enhanced protection to personnel and equipment in the event that gas tube 16 fails (e.g., the gas tube vents due to overheating). When used as a standard back-up protection device, an MOV has a clamping voltage at a preselected current (e.g., 1 mA) that is greater than the DC breakdown voltage of the gas tube. However, MOVs 100 are used in the present example embodiment in conjunction with gas tube 16 to form a hybrid surge protector 10 that has a reduced reaction time and a reduced impulse breakdown voltage without permitting the MOV to burn out. In the present hybrid surge protector 10, MOVs 100 have a clamping voltage at a preselected current (e.g., 1 mA) that is less than the DC breakdown voltage of gas tube 16.

The above geometry provides for three possible ground paths when an overvoltage situation arises. The first ground path is the aforementioned ground path between end electrodes 20 and ground electrode 30 via gas tube 16, and is referred to hereinbelow as the "gas tube ground path." The second ground path is between fail-safe spring 40 and ground electrode 30 when fusible element 60 melts, and is referred to hereinbelow as the "fail-safe ground path." The third ground path is between end electrodes 20 and ground electrode 30 via MOVs 100 when the MOVs are active (i.e., conducting), and is referred to hereinbelow as the "MOV ground path." The predominance of one of these ground paths over the others changes during a voltage surge depending on the state of the overvoltage.

When a voltage surge first occurs, MOVs 100 respond faster than gas tube 16 in the sense that the MOVs become conductive faster than the gas in gas tube 16 becomes conductive. This establishes the predominance of the MOV ground path over the gas-tube ground path. This means that most of the initial voltage in the voltage surge is directed away from the gas-tube ground path, which prevents gas tube 16 from experiencing an initial voltage surge that can exceed its DC breakdown voltage and cause the gas tube to fail.

However, some of the initial voltage from the voltage surge travels over the gas-tube ground path. This voltage starts to activate gas tube 16. As the voltage surge continues, gas tube 16 continues to activate and as it does so, it attracts increasing amounts of voltage to the gas-tube ground path until it becomes the predominant ground path. The resulting reduced voltage over the MOV ground path causes MOVs 100 to de-activate (i.e., become non-conductive), which closes off the MOV ground path. At this point, this leaves only the gas-tube ground path. If the voltage now traveling over the gas-tube ground path causes gas tube 16 to heat up to a sufficiently high temperature, then fusible element 60 melts, which engages fail-safe spring 40 as described above, thereby establishing the fail-safe ground path, which overrides the gas-tube ground path, thereby avoiding failure of the gas tube.

Surge Protection Module

Figure 6:
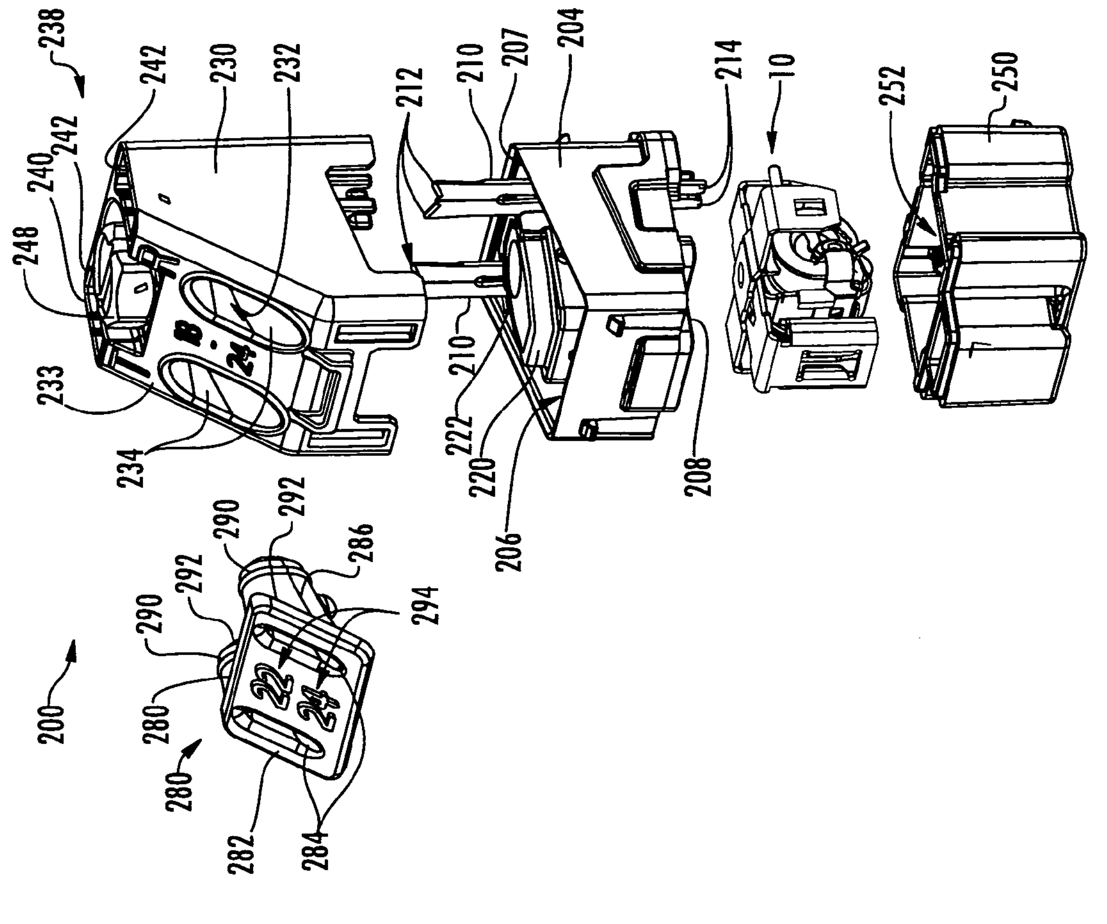
FIG. 6 is an exploded view of an example embodiment of a surge protection module for a NID that includes the hybrid surge protector of the present invention.
Figure 7:
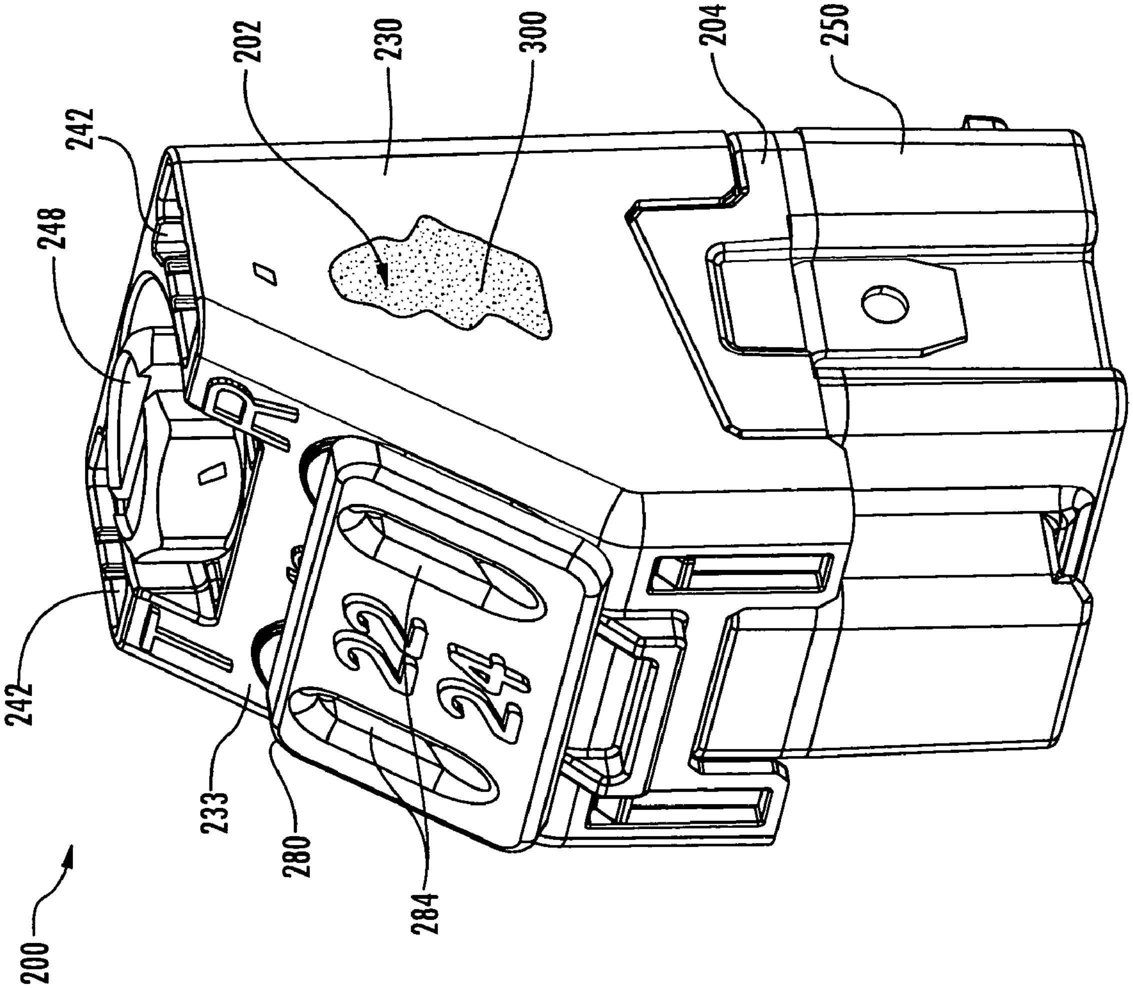
FIG. 7 is a perspective view of the assembled surge protection module of FIG. 6, showing a cut-away section that reveals a sealant in the module interior.

FIG. 6 is an exploded perspective view of an example embodiment of a surge protection module 200 for a NID that includes the surge protector 10 of the present invention contained within. FIG. 7 is a perspective view of surge protection module 200 as assembled. Surge protection module 200 is also commonly referred to as a "station protection module" and is used in telephone NIDs. Surge protector module 200 is, for example, placed on the side of a telephone subscriber's residence to protect the telephone lines and equipment at the subscriber end from being damaged by voltage surges caused, for example, by lightning strikes. The particular construction of the surge protector module 200 is exemplary only and can be adapted for use in other telecommunications-related applications and packagings, as are known in the art.

Surge protection module 200 generally includes a housing 204 that defines a housing interior 206. In a preferred embodiment, housing 204 is made of plastic. Housing 204 has an upper end 207, a lower end 208 and supports in its interior 206 two IDCs 210 each having upper tines 212 that extend upwardly from the interior, and lower tines 214 that extend downwardly from the interior. IDC upper tines 212 are used attach and affix telephone (provider) lines (not shown) to the module. If desired, stud and nut terminals may be used in place of the IDCs 210 shown. Housing 204 also includes a central pillar 220 in interior 206 that includes a threaded hole 222.

Surge protection module 200 also includes a stuffer box 230 that defines a stuffer box interior 232. Stuffer box is configured so that it fits over housing upper end 207 and at least partially covers housing 204. Stuffer box 230 has an angled front face 233 with elongate apertures 234 sized to accommodate telephone (provider) lines (not shown) having a particular wire gauge (e.g., AWG 18 and 24). Stuffer box 230 also includes a back side 238, and a top 240 that includes openings 242 that accommodate IDCs 210 when the stuffer box covers housing 204. Top 240 also includes a central hole 244 through which a securing screw 248 can be inserted and then secured within threaded hole 222 of housing 204 to affix stuffer box 230 to housing 204.

Surge protection module 200 also includes a grounding box 250 that defines a grounding box interior 252 configured to accommodate at least a portion of surge protector 10. Grounding box is configured to slide into and connect with lower end 208 of housing 204. Lower IDC tines 214 engage leads 26 when housing 204 is connected to grounding box 250. When grounding box 250 and housing 204 are connected, they enclose surge protector 10 within module 200. Surge protector 10 is also in electrical contact with grounding box 250 via ground electrode 30. Surge protector 10 is intended to conduct any voltage surges to grounding box 250, which is connected to earth ground upon installation of the NID. The components of module 200 are typically potted to help secure them all together. Module 200 generally serves as a protective enclosure that defines a module interior 202 as formed by stuffer interior 232, housing interior 206 and grounding box interior 252.

Provider Wire Guide

Figure 8:
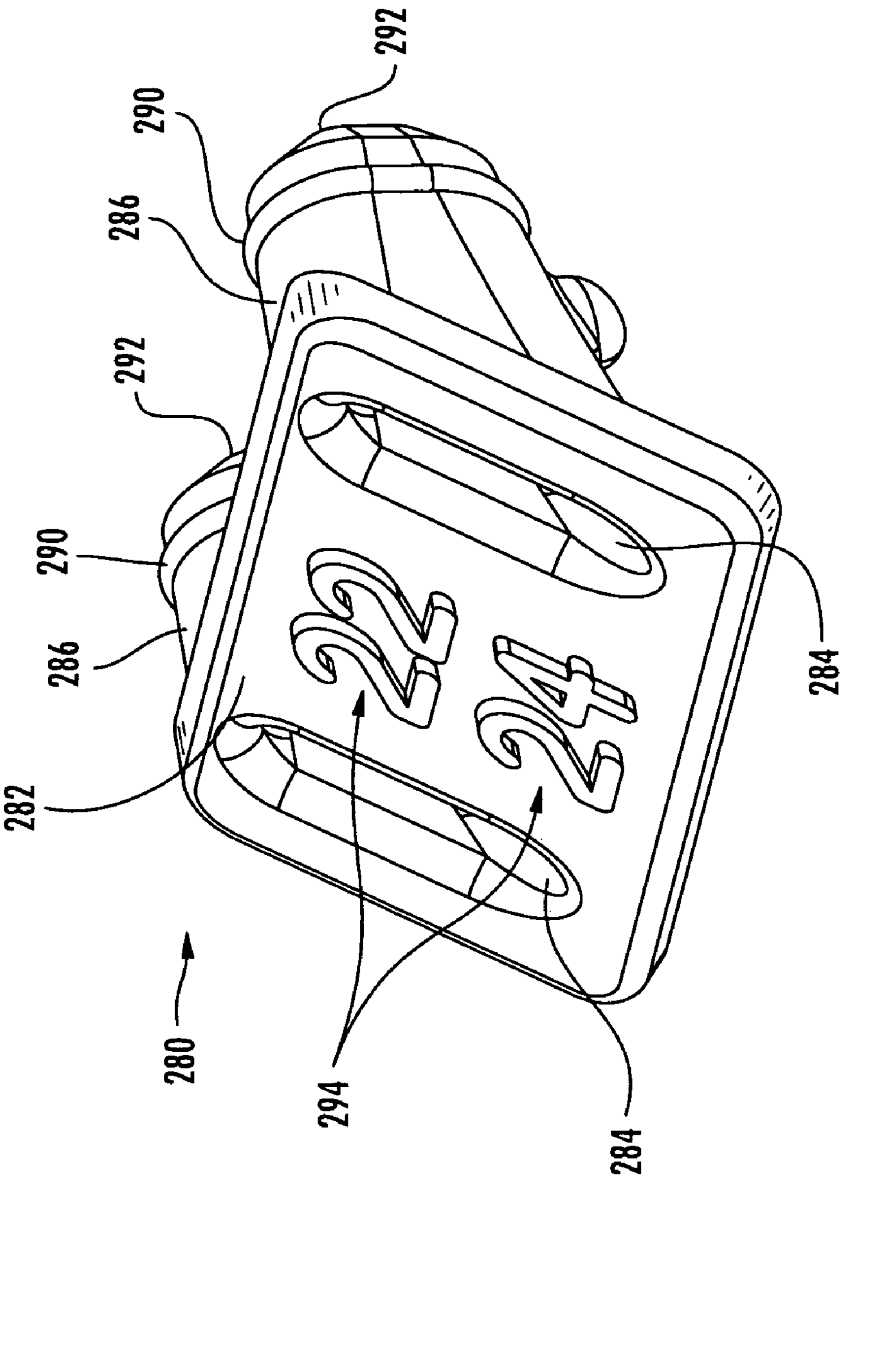
FIG. 8 is a close-up perspective view of the wire guide optionally employed in the surge protection module of FIG. 6.

In an example embodiment module 200 optionally includes a wire guide insert ("wire guide") 280, a front perspective close-up view of which is shown in FIG. 8. Wire guide 280 is shown in FIG. 7 as incorporated into stuffer box 230. Wire guide 280 includes an angled front face 282 that have elongate openings 284 formed therein that lead to respective elongate wire conduits 286 that are configured to fit into and be received by stuffer box openings 234. Wire conduits 286 preferably have ribs 290 formed at their distal ends 292. Openings 284 are sized to accommodate select gauges of telephone (provider) wire, such as AWG 22 and 24. Angled front face 282 optionally includes indicia 294 that indicate the particular wire gauge(s) accommodated by openings 284.

Wire guide 280 is mated with stuffer box 230 by inserting wire conduits 286 into stuffer box openings 234 much like how the prongs of a plug are inserted into a socket. Wire conduits 286 are spaced apart and sized to closely fit into stuffer openings 234. Ribs 290 serve to maintain wire guide 280 engaged in openings 234 of stuffer box 230. Wire guide 280 is preferably used when stuffer box openings 234 are sized for different gauge wires than those intended to be used with module 200. For example, when F-drop provider wire is to be used, wire guide 280 can be removed from stuffer box 230 and the F-drop provider wires inserted directly into stuffer box openings 234.

Gel-Filled Surge Protector Module

In an example embodiment, module interior 202 is at least partially filled (and preferably is completely filled) with a sealant material 300, such as protective gel (hereinafter, "gel 300"), as shown in the partial cut-away view module interior 202 shown in FIG. 7. In an example embodiment illustrated in FIG. 9, gel 300 surrounds surge protector 10 to protect it from corrosion due to moisture, damage from other environmental effects or elements, and/or to prevent short circuits from forming. A sealant material in the form of a wax can also be used. In an example embodiment, gel 300 is contained in interior 232 of stuffer box 230, and wire guide 280 serves to contain the gel within the stuffer box interior.

Some gels 300 are relatively viscous and could serve to inhibit the movement of fail-safe spring 40 when fusible element 60 melts during an overvoltage situation. Accordingly, with reference again to FIG. 9, in an example embodiment, at least one gap-filling member 320 is inserted between electrodes 20 and fail-safe spring 40 so that gel 300 does not fill gap G. In an example embodiment, gap-filling member 320 is made from an anti-static, insulating meltable material. An example type of a suitable material for gap-filling member 320 is a solid foam, such as standard packaging Styrofoam, having a melting temperature below that of fusible material 60. When gas tube 16 heats up from an overvoltage, gap-filling member 320 melts, leaving air filling the gap G. When solder pellet 60 melts soon after, tabs 46 of fail-safe spring 40 are free to move through the air in gap G when contacting electrode edges 22 rather than having to move through the more viscous gel 300.

Wire-Retaining Feature

Figure 9:
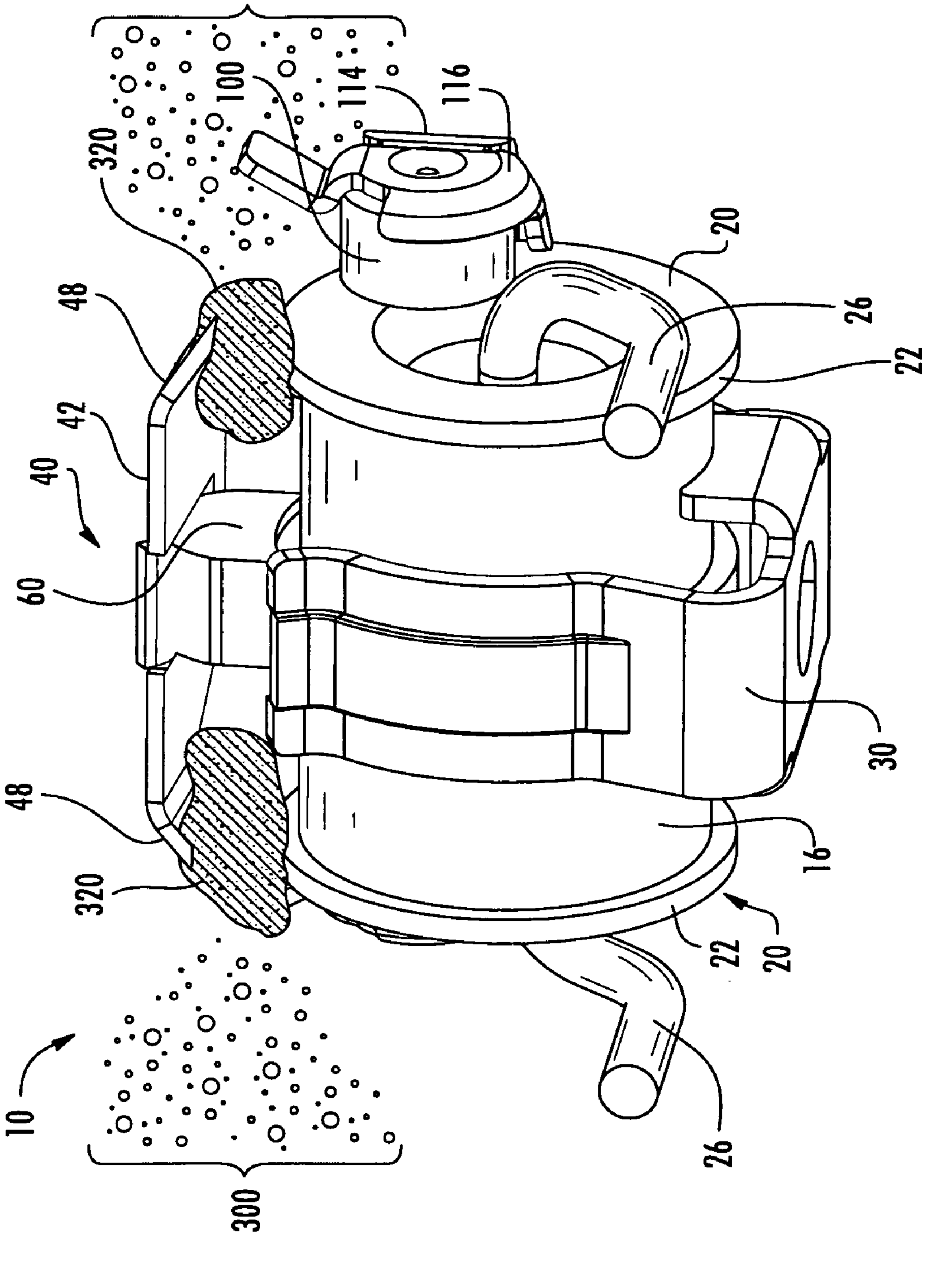
FIG. 9 is a perspective view of the surge protector of FIG. 4, wherein the surge protector is immersed in a sealant such as protective gel, and wherein insulating elements are arranged in the respective gaps between the fail-safe spring and the gas-tube end electrodes.
Figure 10:
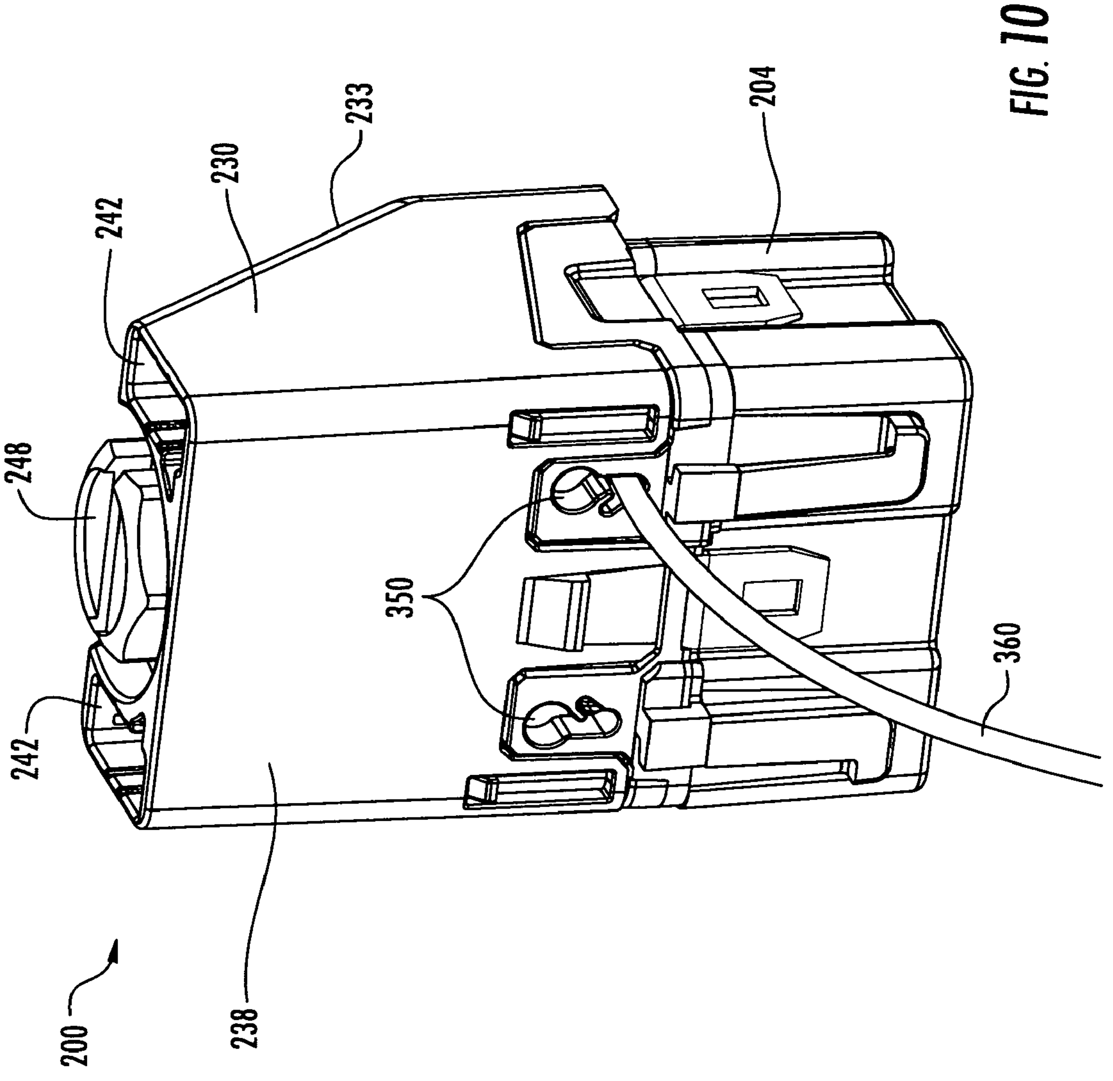
FIG. 10 is a perspective view of the back side of an example embodiment of the surge protection module as shown in FIG. 7, illustrating wire-retaining features in the stuffer box that serve to secure the subscriber wires to the module.
Figure 11:
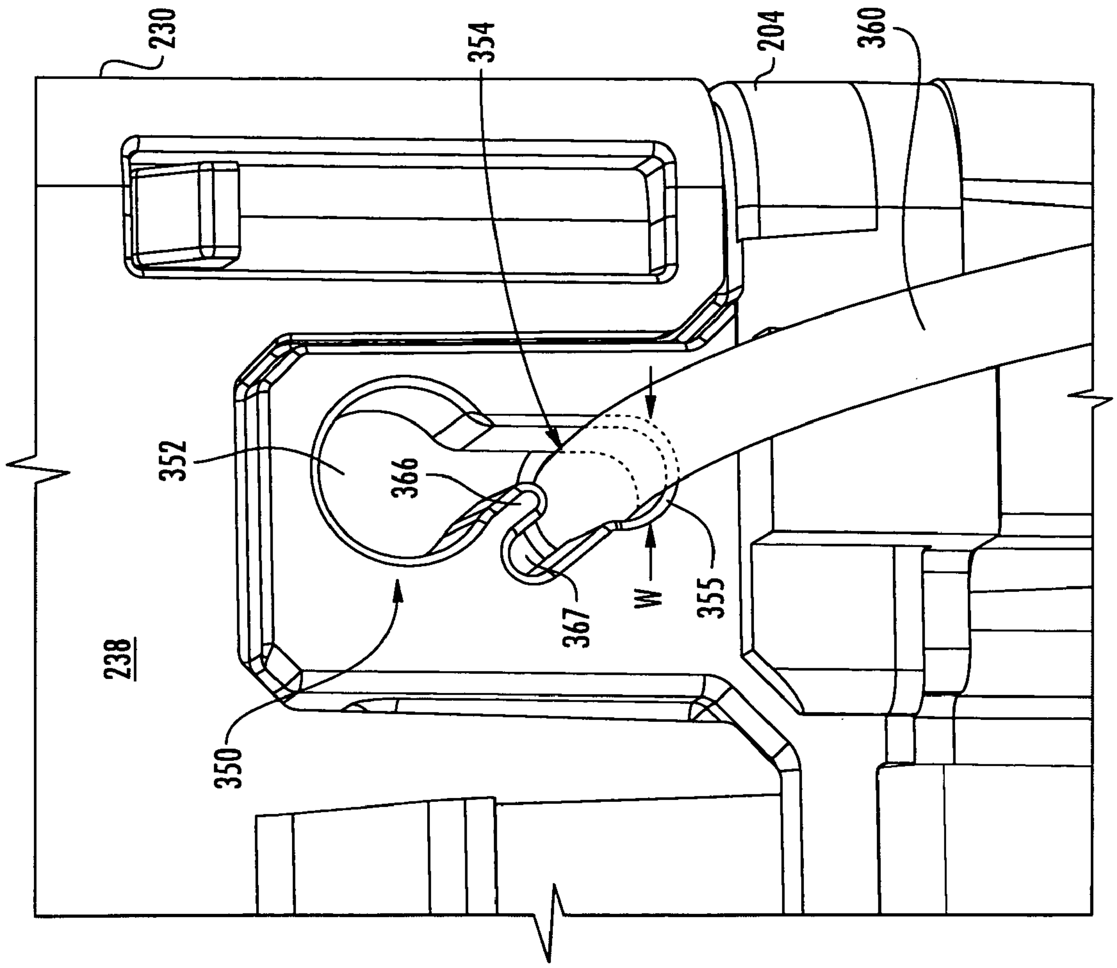
FIG. 11 is a close-up view of the wire-retaining feature of FIG. 10.

FIG. 10 is a rear perspective view of surge protector module 200, and FIG. 11 is a close up view of back side 238 of stuffer box 230 of the surge protector module 200 of FIG. 9. Stuffer box 230 includes, on the lower portion of back side 238, at least one opening 350 that accommodates a subscriber wire 360. Two such openings 350 are shown. Each opening 350 includes a round upper section 352 sized to be slightly larger than subscriber wire 360, and a lower elongate section 354 open to the upper section and that has a width W sized closely to the subscriber wire width. Lower section 354 has rounded bottom end 355 sized closely to the curvature of subscriber wire 360. A retaining feature in the form of a flexible tab 366 extends into opening 350 from one side and serves to partially separate the upper and lower sections 352 and 354. Tab 364 is angled downward toward lower section 354, and defines a slot 367 that provides room for the tab to downwardly flex to allow the subscriber line to easily pass from upper section 352 to the lower section 354.

When subscriber wire 360 is connected to surge protection module 200 and in particular to an IDC 210 therein, it is first inserted through opening 350 at upper section 352. This insertion is facilitated by upper section 352 being sized larger than subscriber wire 360. Once subscriber wire 360 is inserted and engaged with lower tines 214 of IDC 210, the portion of the subscriber wire at opening 350 is pushed downward so that it moves from upper opening 352 to lower portion 354. As subscriber wire 360 moves downward, tab 364 flexes into slot 367 to allow the subscriber wire to pass into lower section 354, where the wire settles into rounded end 355. Once so settled, tab 364 flexes back into place and serves to keep subscriber wire 360 nestled into rounded end 355 of lower opening 354.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A hybrid surge protector assembly for a network interface device (NID), for protecting against a voltage surge, comprising:

a gas-tube protective element that includes two end electrodes and a central ground electrode that define a first path to ground during the voltage surge;

a conducting fail-safe spring connected to the ground electrode and having an end supported above the gas-tube protective element by a fusible element that, when melted, allows the fail-safe spring end to electrically contact the gas-tube end electrodes, the fail-safe spring defining a second path to ground from the gas-tube end electrodes when the fusible element melts during the voltage surge;

at least one metal-oxide varistor element (MOV) arranged on a gas-tube end electrode and electrically connected to the ground electrode by a MOV spring, wherein the MOV and MOV spring are configured to define a third path to ground from the gas-tube end electrodes when the at least one MOV is activated by the voltage surge; and wherein the third path to ground prevents the gas-tube protective element from initially overheating, and wherein the first path to ground prevents the gas-tube protective element from failing due to a portion of the voltage discharge following the second path to ground.

2. The hybrid surge protector of claim 1, wherein the fail-safe spring and gas-tube end electrodes are separated by respective gaps, and wherein at least one of the gaps is filled with a gap-filling member made of insulating, meltable material.

3. The hybrid surge protector of claim 2, wherein the fusible element has a melting temperature, and wherein the gap-filling member includes a solid foam having a melting temperature less than the fusible element melting temperature.

4. The hybrid surge protector of claim 2, further including:

an enclosure that defines an interior region and that surrounds the hybrid surge protector when the hybrid surge protector is placed in said interior region; and a sealant material contained in the interior region so as to immediately surround the hybrid surge protector.

5. The hybrid surge protector of claim 4, wherein the sealant material includes a gel.

6. The hybrid surge protector of claim 1, wherein the gas-tube protective element has a direct-current (DC) breakdown voltage, and wherein the MOV has a clamping voltage less than the DC breakdown voltage.

7. A hybrid surge protection module for a network interface device (NID) for connecting provider wires to subscriber wires, comprising:

the hybrid surge protector of claim 1; and an enclosure that defines an enclosure interior that accommodates the hybrid surge protector, the enclosure configured to receive and electrically connect the provider and subscriber wires to the hybrid surge protector.

8. The hybrid surge protection module of claim 7, further including a sealant material held within the enclosure interior so as to surround the hybrid surge protector.

9. The hybrid surge protector module of claim 7, wherein:

the enclosure includes a stuffer box having first openings sized to receive provider wires of at least a first gauge; and a wire guide configured to be inserted into the stuffer box openings, the wire guide having second openings sized to received wires of at least a second gauge different from the first gauge.

10. The hybrid surge protector of claim 7, wherein the enclosure includes a stuffer box having a back side with at least one opening for accommodating at least one subscriber wire, the at least one opening including an upper section sized slightly larger than the at least one subscriber wire, a lower section open to the upper section and sized to the subscriber wire, and a flexible tab that extends into the opening between the upper and lower sections and that serves to retain the subscriber-wire within the lower section.

11. A method of providing overvoltage surge protection for a network interface device, comprising:

defining a first path to ground during the overvoltage by providing a gas-tube protective element that includes two end electrodes and a central ground electrode connected to ground;

defining a second path to ground from the gas-tube end electrodes by providing a conducting fail-safe spring connected to the ground electrode and having an end supported above the gas-tube protective element by a fusible element that, when melted during the overvoltage, allows the fail-safe spring end to electrically contact the gas tube end electrodes to establish said second path to ground;

providing a third path to ground by providing at least one metal-oxide varistor element ("MOV") on a gas-tube end electrode such that the MOV is electrically connected to the ground electrode by a MOV spring, wherein the MOV and MOV spring are configured to define said third path to ground from the gas-tube end electrodes when the MOV is activated by the voltage surge; and initially directing the overvoltage to ground via the first and third paths to ground, wherein the third path to ground is initially predominant and then the first path to ground becomes predominant via deactivation of the MOV during the overvoltage.

12. The method of claim 11, further including after the first path to ground becomes predominant, causing the second path to ground to become predominant via heating of the gas-tube protective element and the subsequent melting the fusible element.

13. The method of claim 11, wherein the fusible element has a melting temperature and maintains respective gaps between the fail-safe spring and the gas-tube end electrodes, and further including:

providing within at least one of the gaps an insulating gap-filling member made of a meltable insulating material and having a melting temperature less than the fusible element melting temperature.

14. The method of claim 13, including covering at least a portion of the fail-safe spring and the gas-tube end electrodes with a gel, wherein the gap-filling member prevents the gel from occupying the at least one gap.

15. A hybrid surge protector assembly for a network interface device (NID) that connects provider wires to subscriber wires and protects against a voltage surge, comprising:

a three electrode gas-tube protective element having a central ground electrode and two end electrodes, and having a direct-current (DC) breakdown voltage;

a fail-safe spring electrically connected to the ground electrode and held spaced apart from the end electrodes by respective gaps using a fusible element in thermal contact with the gas-tube protective element; and at least one metal-oxide varistor (MOV) placed in contact with an end electrode and electrically connected to ground via an MOV spring, said MOV having a clamping voltage less than the DC breakdown voltage so that in response to the voltage surge the MOV activates faster than the gas-protective tube to form an initial predominant path to ground.

16. The hybrid surge protector assembly of claim 15, wherein the fusible element has a melting temperature, and further including:

at least one gap-filling member maintained in at least one of the gaps and made of an anti-static, insulating, meltable material having a melting temperature less than the fusible element melting temperature; and a sealant material surrounding at least a portion of the fail-safe spring and the end electrodes, said sealant material prevented from filling the least one gap by the at least one gap-filling member arranged therein.

17. A hybrid surge protection module for a NID, comprising:

the hybrid surge protector assembly of claim 15;

a housing defining an interior that contains the hybrid surge protector and that includes insulation displacement connectors (IDCs) for connecting the provider wires and subscriber wires to the hybrid surge protector; and a sealant gel contained within the housing interior so as to at least partially surround the hybrid surge protector assembly.

18. The hybrid surge protection module of claim 17, wherein the housing includes a stuffer box having a back side with at least one opening for receiving corresponding at least one subscriber wire, the at least one opening including an upper section sized slightly larger than the at least one subscriber wire, a lower section sized to the subscriber wire, and a flexible tab that extends into the opening between the upper and lower sections and that serves to retain the subscriber-wire within the lower section.

19. The hybrid surge protector assembly of claim 15, wherein the fail-safe spring clips to the ground electrode.

20. The hybrid surge protector assembly of claim 19, wherein the MOV spring clips to the fail-safe spring.

21. A hybrid surge protector assembly for a network interface device (NID), for protecting comprising:

a gas-tube protective element that includes two end electrodes and a central ground electrode that define a first path to ground during the voltage surge; and a conducting fail-safe spring connected to the ground electrode and having an end supported above the gas-tube protective element by a fusible element that, when melted, allows the fail-safe spring end to electrically contact the gas-tube end electrodes, the fail-safe spring defining a second path to ground from the gas-tube end electrodes when the fusible element melts during the voltage surge;

wherein the fail-safe spring and gas-tube end electrodes are separated by respective gaps, and wherein at least one of the gaps is filled with a gap-filing member made of insulating, meltable material; and wherein the first path to ground prevents the gas-tube protective element from failing due to a portion of the voltage discharge following the second path to ground, and wherein the fusible element has a melting temperature, and wherein the gap-filling member includes a solid foam having a melting temperature less than the fusible element melting temperature.

* * * * *